Dec. 2, 1952     C. Y. TELLANDER     2,620,088
PRESSURE TYPE BOILER OR COOKER
Filed Sept. 1, 1950
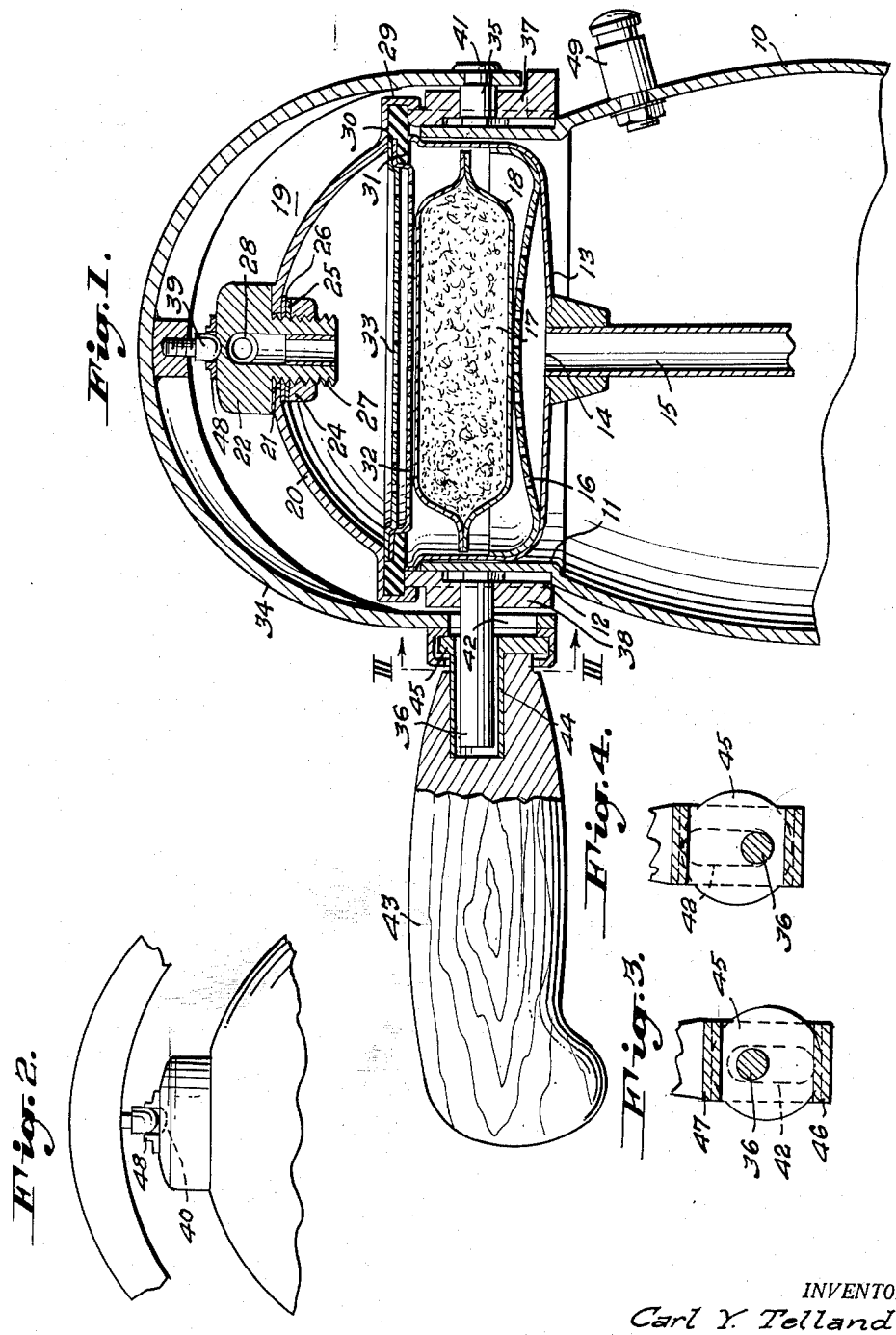
INVENTOR.
Carl Y. Tellander
BY
Henry C. Parker
ATTORNEY Patented Dec. 2, 1952

2,620,088

UNITED STATES PATENT OFFICE 2,620,088

PRESSURE TYPE BOILER OR COOKER

Carl Y. Tellander, Nykoping, Sweden, assignor to Aktiebolaget Moderna Kök, Stockholm, Sweden, a corporation of Sweden Application September 1, 1950, Serial No. 182,710
In Sweden November 16, 1948

7 Claims. (Cl. 220—56)

1

The present invention relates to pressure type boilers or cookers, especially for household use, and it relates more particularly to apparatus for brewing coffee, tea and similar beverages under a certain super pressure. Such boilers or brewing apparatus, to which the invention relates, are provided with a removable lid which is adapted, when in position on the boiler vessel, to provide a steam-tight seal, and also with a preferably heat insulated handle by means of which the apparatus can be lifted.

It is a primary object of the invention to provide simplified and convenient means for holding the lid in sealing position on the hot water and steam generating vessel.

Other objects of the invention will appear from the following detailed description of a preferred embodiment with reference to the accompanying drawing, in which Figure 1 is an axial section through a conventional coffee brewing apparatus or percolator in which the invention has been applied, a yoke or bail member provided for holding down the lid being shown in its operating position, Figure 2 is a detail view showing the yoke member in released position to permit removal of the lid, and Figures 3 and 4 are cross sections taken on the line III—III in Figure 1 and showing a locking member for the yoke or lid respectively in locking position and in released position.

Referring to the drawing, the reference numeral 10 designates generally the hot water and steam generating container of a pressure type coffee brewer or percolator of conventional design, the upper part only of the container being shown on the drawing. The container 10, which preferably is made of aluminum or stainless steel, tapers upwardly to a cylindrical neck portion 11, over which a steel ring 12 has been shrunk. The upper edge of said steel ring reaches somewhat higher up than the cylindrical neck portion 11 of the vessel and forms together with said neck portion an annular shoulder or seat for the outwardly bent upper edge of a plate element 13 in the form of a narrow cup, which at the bottom is provided with one or more apertures 14, said apertures communicating with the upper end of a riser tube 15, the lower end of which (not shown) opens into the container a short distance above the bottom of the latter. The cup-shaped plate element 13 has a blind bottom in the form of a sieve element 16 provided with a great number of small apertures. Said sieve element 16 serves to receive a quantity 17 of ground coffee which preferably is enclosed in a covering 18 of filtering paper or other material, which is permeable to water and steam.

The reference numeral 19 designates generally a detachable cover or lid having a dome-shaped upper portion 20 provided with a central aperture 21 into which is inserted a stop abutment in the form of a solid fitting 22 having a head portion 23 and a screw-threaded shank portion onto which is screwed a nut 24 which through the intermediary of a washer 25 and a sealing element 26 sealingly holds the solid fitting 22 in position on the lid. The fitting 22 has an axial bore 27 which communicates at its lower end with the space below the lid and at its upper end with an outlet pipe 28 for the ready-brewed coffee. At its lower edge the lid 19 is provided with a bent-over flange 29 which embraces the steel ring 12 and forms an annular seat 30 for a sealing ring 31 of rubber or the like. Clamped in between the upper side of the sealing ring 31 and the upper wall of the annular seat 30 are two slightly spaced sieve plates 32 and 33, the apertures in one sieve plate being staggered with respect to the apertures in the other sieve plate.

The pressure required for holding the cover down in sealing engagement with the upper edge of the boiler vessel 10 and with the upper edge of the cup-shaped plate 13 is applied by means of a semi-circular yoke or bail member 34 which is pivotally fastened to the steel ring 12 by means of two pivots 35, 36 secured to enlarged portions 37 and 38 of the steel ring at diametrically opposite points, said yoke or bail member being provided intermediate its ends with an adjustable abutting screw 39, the head portion of which is adapted to bear against the bottom of a shallow recess 40 provided in the upper surface of the fitting 22. The pivot 35, which as shown may be in the shape of a short screw provided with a head, is received in a circular aperture 41 in one end of the yoke member 34, whereas the pivot 36 consists of a radially extending straight cylindrical shaft or rod which passes through slotted opening 42 in the other end of the yoke member 34. On the straight cylindrical shaft 36 is turnable but not axially displaceable a heat-insulated handle 43 provided with a metal fitting 44. Formed integral with said fitting is a circular cam member 45 which is arranged eccentrically with respect to the turning axis of the handle 43 and is adapted to co-operate alternately with a lower abutment 46 and with an upper abutment 47 provided on the outside of the corresponding end of the yoke member 34, said abutments or cam-engaging means 46 and 47 being spaced apart a distance which somewhat exceeds the diameter of the cam member 45. When the handle 43 occupies its normal position as shown in Figure 1, the cam member 45 will engage the lower abutment 46, as seen in Figure 3, and hold the corresponding end of the yoke member 34 in its lowermost position, the adjustable abutting screw 39 provided on the underside of the middle portion of the yoke member then pressing against the upper surface of the solid fitting 22 with a sufficient force to bring the sealing ring 31 of the lid 19 into sealing engagement with the upper edge of the boiler vessel 10 and with the upper edge of the cup-shaped plate member 13, so that a steam-tight seal is provided between the boiler vessel and the said plate member. If the handle 43 is turned through 180° from its normal position as shown in Figure 1 the cam member 45 will instead engage the upper abutment 47 on the yoke member 34, lifting the corresponding end of said member, so that the abutting screw 39 is moved away from the fitting 22 and the yoke member can be swung away from its holding position to permit removal of the lid.

It should be observed that the pressure, with which the sealing ring is pressed against the boiler vessel when the handle is turned to its normal position, depends on the setting position of the abutting screw 39, in that the pressure can be increased by lengthening and decreased by shortening the effective length of the screw.

To facilitate the setting of the yoke member 34 in its correct holding position the fitting 22 on the lid 19 is provided with a semi-circular raised portion 48 which engages the abutting screw 39 when the yoke member has reached the upright position.

In the construction shown in Figures 3 and 4 the slotted opening 42 in one end of the yoke member is so long that the handle 43 can be freely turned in either direction. Alternatively, the elongated opening 42 in the yoke member 34 can be so positioned and dimensioned that the upper semi-circular wall of the slotted opening will abut against the handle rod 35 before the cam member 45 has been turned to the position shown in Figure 3, thereby defining a definite locking position for the yoke member and handle.

In the embodiment illustrated in the drawing the yoke member is elastically flexible so that it will bend and permit steam to escape between the lid 19 and the boiler vessel 10 if for some reason the steam pressure within the vessel should exceed a permissible maximum value. If desired, a separate safety valve 49 may be provided, however.

The invention is, of course, not limited to the particular embodiments illustrated in the drawing and described in detail above but various modifications can be made without receding from the inventive idea.

I claim:

1. A pressure type cooking vessel which comprises a container for generating hot water and steam, a detachable cover for the container, a yoke member secured to the top of the container above the cover by radial pivots mounted on opposite sides of the container, a handle protruding radially from the side of the container and rotatably mounted on said container in line with one of said pivots, a cam mounted at the inner end of said handle and rotatable therewith, cam-engaging means mounted on the adjacent end of said yoke and cooperating with said cam to force the yoke into engagement with the cover to hold the same in sealing engagement with the container in one position of the handle and to release the yoke for pivotal movement in a second position of said handle.

2. The cooking vessel of claim 1 wherein one of said pivots comprises a shaft radially mounted on said container and the handle is rotatably mounted on said shaft.

3. The cooking vessel of claim 2 wherein the end of said yoke which is adjacent the handle is provided with a slotted opening through which said shaft extends, said cam-engaging means being mounted on the yoke above and below said slotted opening.

4. The cooking vessel of claim 1 wherein said cam-engaging means comprises abutments engaging said cam and flanges on the abutments bent over said cam to prevent the cam and the handle carrying the same from being displaced axially.

5. The cooking vessel of claim 1 wherein said yoke member is provided with a central adjustable abutting screw adapted to be pressed against the cover to hold the latter in sealing engagement with the container.

6. The cooking vessel of claim 5 wherein the cover is provided with a stop abutment having a semi-circular raised portion adapted to engage the abutting screw when the yoke is in its upright position.

7. The cooking vessel of claim 1 wherein one of said pivots is a shaft on which said handle is mounted, said shaft extending through a slot in the adjacent end of said yoke, the slot, the cam and the cam engaging means being so constructed and arranged that, when the handle is turned to tighten the cover, a definite locking position is reached.

CARL Y. TELLANDER.

REFERENCES CITED

The following references are of record in the file of this patent:

UNITED STATES PATENTS

| Number | Name | Date |
|---|---|---|
| 1,739,911 | McMurray | Dec. 17, 1929 |
| 1,960,897 | Crossen | May 29, 1934 |